United States Patent
Geuss et al.

(10) Patent No.: US 11,624,466 B2
(45) Date of Patent: Apr. 11, 2023

(54) ATTACHMENT DEVICE FOR A HOSE ARRANGEMENT

(71) Applicant: Fränkische Industrial Pipes GMBH & CO. KG, Königsberg (DE)

(72) Inventors: Markus Geuss, Königsberg (DE); Ondreij Semerád, Trebic (CZ)

(73) Assignee: FRÄNKISCHE INDUSTRIAL PIPES GMBH & CO. KG, Königsberg (DE)

( * ) Notice: Subject to any disclaimer, the term of this patent is extended or adjusted under 35 U.S.C. 154(b) by 27 days.

(21) Appl. No.: 16/972,445

(22) PCT Filed: May 27, 2019

(86) PCT No.: PCT/EP2019/063610
§ 371 (c)(1),
(2) Date: Dec. 4, 2020

(87) PCT Pub. No.: WO2019/233798
PCT Pub. Date: Dec. 12, 2019

(65) Prior Publication Data
US 2021/0231247 A1    Jul. 29, 2021

(30) Foreign Application Priority Data
Jun. 6, 2018 (DE) .................... 10 2018 208 953.1

(51) Int. Cl.
*F16L 33/01* (2006.01)
*F16L 33/02* (2006.01)
(Continued)

(52) U.S. Cl.
CPC ............. *F16L 39/005* (2013.01); *F16L 33/01* (2013.01); *F16L 33/30* (2013.01); *F16L 39/02* (2013.01)

(58) Field of Classification Search
CPC . F16L 33/01; F16L 33/30; F16L 37/56; F16L 37/565; F16L 39/00; F16L 39/005; F16L 39/02
(Continued)

(56) References Cited

U.S. PATENT DOCUMENTS 3,986,732 A    10/1976  Stanley
5,931,184 A *   8/1999  Armenia .................. F16L 39/02
                                                    285/123.1

(Continued)

FOREIGN PATENT DOCUMENTS

CN    2869537 Y    2/2007
CN    203703450 U    7/2014
(Continued)

OTHER PUBLICATIONS

German Application No. 10 2018 208 953.1, German Search Repod dated Apr. 23, 2019, 9 pages.

(Continued)

*Primary Examiner* — Zachary T Dragicevich
*Assistant Examiner* — William S. Choi
(74) *Attorney, Agent, or Firm* — Kilpatrick Townsend & Stockton LLP (57) ABSTRACT

An attachment device, comprising a first line connector with a first fluid passage and a second line connector. The second line connector surrounds the first line connector such that a second fluid passage is created between the first line connector and the second line connector. The second fluid passage is fluidically separated from the first fluid passage. The second line connector can be pushed onto the first line connector from the end thereof situated opposite the hose attachment of the first line connector. The attachment is arranged in a line comprising the attachment device connected using a corresponding connection method.

12 Claims, 5 Drawing Sheets

(51) Int. Cl.
  *F16L 33/30* (2006.01)
  *F16L 39/00* (2006.01)
  *F16L 39/02* (2006.01)
(58) Field of Classification Search
  USPC ....... 285/120.1, 123.1, 123.15, 123.3, 124.1,
  285/222.1
  See application file for complete search history.

(56) References Cited

U.S. PATENT DOCUMENTS

| | | |
|---|---|---|
| 10,724,663 B2 * | 7/2020 | Rose .................. F16L 33/01 |
| 2003/0034648 A1 * | 2/2003 | Zitkowic, Jr. ......... F16L 37/565 |
| | | 285/120.1 |
| 2007/0222216 A1 | 9/2007 | Bauer |
| 2007/0241560 A1 * | 10/2007 | Malone .................. F16L 37/56 |
| | | 285/123.3 |
| 2010/0276026 A1 | 11/2010 | Powell et al. |

FOREIGN PATENT DOCUMENTS

| | | |
|---|---|---|
| DE | 102006013899 B3 | 11/2006 |
| EP | 2012052 A1 | 1/2009 |
| FR | 2927398 A1 | 8/2009 |
| FR | 3065274 A1 | 10/2018 |

OTHER PUBLICATIONS

International Application No. PCT/EP2019/063610, International Search Report and Written Opinion dated Aug. 30, 2019, 13 pages.
Chinese Application No. 201980037955.5, Chinese Office Action dated Nov. 22, 2021, No English translation available, 9 pages.

* cited by examiner

ABSTRACT DEVICE FOR A HOSE ARRANGEMENT

CROSS REFERENCE TO RELATED APPLICATION

This application is a U.S. national phase of International Patent Application No. PCT/EP2019/063610 filed on May 27, 2019, which claims priority to German Patent Application No. 10 2018 208 953.1, filed in Germany on Jun. 6, 2018. The entire contents of the above-referenced applications are hereby incorporated herein by this reference.

FIELD OF THE INVENTION

The present invention relates to an attachment device for a hose arrangement having a plurality of chambers.

BACKGROUND OF THE INVENTION

In the prior art, hose arrangements are known in which a hose with a first diameter is arranged in a hose with a second diameter which is larger than the first diameter. Such hose arrangements are used, for example, for a fluid flowing in the inner hose, for example SCR, to be heated by a heating medium flowing in the outer hose, that is to say in a space between the outer hose and the inner hose.

SUMMARY

In this case, assembling the inner and outer hose with an attachment device which connects the hose arrangement to a superordinate assembly, for example a fluid source, can be very complex. In particular, when one end of the hose arrangement is already connected to a corresponding attachment device and the hoses are substantially rigid in their compression direction, a connection of the hose arrangement at its other end to a further attachment device, which usually requires an at least partially simultaneous connection of the inner and outer hose to the attachment device, is associated with great effort and many possible incorrect operations.

For example, from DE 10 2016 007 887 A1 a hose arrangement is known which can be connected at its ends to corresponding attachment devices. It is necessary here for the inner hose to have a shorter length than the outer hose, since a corresponding connecting surface of the attachment device for the inner hose protrudes further into the hose arrangement than a corresponding connecting surface of the attachment device for the outer hose. Especially when an end of the hose arrangement is already connected to an attachment device, the inner hose is to be connected "blindly" to the second attachment device, so to speak, since the outer hose and the outer portion of the disclosed attachment device prevent a view of the connection of the inner hose to the attachment device.

It is therefore the object of the present invention to provide an attachment device which can be connected in a simple and secure manner to such a hose arrangement.

DETAILED DESCRIPTION

This object is achieved by an attachment device for a hose arrangement having a plurality of chambers, comprising a first line connector which has a hose connection at one end thereof for connection to a first chamber of the hose arrangement, and a second line connector which has a hose connection at one end thereof for connection to a second chamber of the hose arrangement, wherein the first line connector defines a first fluid passage in its interior, wherein the second line connector and the first line connector are operationally fixedly connected to one another in their assembled state, in which the second line connector surrounds the first line connector so that between the first line connector and the second line connector a second fluid passage is produced which is fluidically separated from the first fluid passage, wherein the hose connection of the first line connector and the hose connection of the second line connector are arranged on the same side of the attachment device in the assembled state, and wherein the second line connector can be pushed onto the first line connector from its end from a completely separated state into the assembled state, which is opposite to the hose connection of the first line connector.

The attachment device according to the invention makes it possible to first connect the first line connector to an inner hose of a hose arrangement mentioned at the beginning, wherein the inner hose remains clearly visible and, for example, easily accessible for tools. After the first line connector has been successfully assembled with the inner hose, the outer hose can be connected to the second line connector, wherein the second line connector is able to be pushed onto the first line connector until the assembled state of the two line connectors with one another has been reached. Such a "decoupled" connection of the attachment device to the inner hose and then to the outer hose dramatically simplifies the assembly work, especially when using machines to press the line connector onto the hose arrangement, and can therefore reduce sources of error that can lead to damage or incorrect assembly of the hose arrangement.

Due to the inventive design of the attachment device, the inner hose and the outer hose can be thermoformed prior to assembly with the attachment device, whereby elasticity, especially in the compression direction of the hose, can be greatly reduced, and yet be connected to the attachment device easily and without damage.

The first line connector and/or the second line connector can be made from a plastic, in particular from a plastic suitable for an injection moulding process, such as PE or PA, in particular PA66 and PA6 with glass fibre reinforcement (GF30), or from a metal such as stainless steel.

A structure, for example a toothed structure, can be arranged on the hose connection, which structure can impede, or even prevent, the hose from being pulled off the hose connection. The structure can be designed, for example, in the form of barbs running in the circumferential direction around the outer circumference of the hose connection, that is to say projections with a steeply rising flank and a gently rising flank. The structure can in particular be designed to come into engagement with the hose after thermoforming.

The first fluid passage and the second fluid passage can advantageously run coaxially with one another. In this case, the first fluid passage passes through the second fluid passage completely, that is to say the first fluid passage is arranged completely within the second fluid passage, provided the second fluid passage is designed as a closed ring. The coaxiality of the two fluid passages, which are also referred to as "fluid spaces", can mean that the second line connector is also pushed onto the first line connector along the two coinciding central axes of the first fluid passage and of the second fluid passage. In particular, the entire second fluid passage can be coaxial with the first fluid passage. This means that the coaxiality of the two fluid passages continues from the hose connections of the attachment device to the superordinate assembly.

A "superordinate assembly" is referred to here in summary as a unit to which the attachment device according to the invention is connected, even if, following the connection to this unit, the first fluid passage may run to a first superordinate assembly and the second fluid passage may run to a second superordinate assembly separated from the first assembly.

In a further development of the present invention, the first line connector can have, at its end opposite the hose connection, a coupling connection for coupling the first line connector to a superordinate assembly not belonging to the attachment device, and the second line connector can have, at its end opposite the hose connection, a coupling connection for coupling the second line connector to the superordinate assembly not belonging to the attachment device, and the coupling connection of the first line connector can run coaxially to the coupling connection of the second line connector. The first line connector and the second line connector can thus be described in such a way that they each have a hose connection at one end thereof and each have a coupling connection at the other end thereof. The second line connector can be pushed onto the first line connector starting with the end of the second line connector on which the hose connection is arranged, onto the first line connector from its coupling connection end in the direction of the hose connection end of the first line connector, so that in the assembled state of the first line connector and the second line connector to each other, the hose connections of the first line connector and the second line connector point in a common first direction of the attachment device and the coupling connections of the first line connector of the second line connector point in a common second direction of the attachment device, which in particular can be opposite to the first direction.

The first line connector and the second line connector can have, associated with the respective coupling connection, at least one annular groove which surrounds the first line connector or the second line connector in each case in a circumferential direction on its outside. Such an annular groove can be designed to accommodate an O-ring as a sealing element which acts between the first line connector and the connection on the superordinate assembly or between the second line connector and the connection on the superordinate assembly.

The second line connector can have at least one springy web which is designed, in the assembled state of the first and the second line connector to one another, to engage with at least one recess of the first line connector so as to prevent a displacement of the second line connector relative to the first line connector in a direction opposite to a push-on direction. The second line connector can have the at least one springy web, advantageously three or four springy webs, at its end assigned to the coupling connection, which protrude radially inward into the second fluid passage. The at least one springy web can be designed in such a way that it allows the second line connector to be pushed onto the first line connector by being deformed radially outward. As soon as the second line connector is pushed completely onto the first line connector, that is, the at least one springy web of the second line connector reaches a corresponding recess on the first line connector, the at least one springy web can, due to the elasticity of the material from which the web is formed, move in the direction of its original formation, that is, radially inward, so as to engage with the recess. The engagement between the at least one springy web and the recess can be designed in such a way, for example by providing a corresponding edge or an undercut, that it is not possible to pull the second line connector from the first line connector without destruction.

It should be mentioned at this point that the first line connector can of course also be designed with the at least one springy web and the second line connector can be designed with the corresponding recess in an analogous manner. The features described above are to be transferred accordingly from the one line connector to the other line connector.

The first line connector can have at least one stop which is designed to rest against at least one counter-stop of the second line connector in order to prevent displacement of the first line connector relative to the second line connector in the push-on direction. The interaction of the stop with the counter-stop makes it possible to define a maximum position up to which the second line connector can be pushed onto the first line connector. The position in which the stop of the first line connector interacts with the counter-stop of the second line connector can coincide with that position in which the at least one springy web can engage with the corresponding recess. In this way, the second line connector can be displaced relative to the first line connector both in the push-on direction of the second line connector onto the first line connector and counter to same.

The element of the first line connector which forms the stop of the first line connector can also serve as a stop for a hose to be attached to the hose connection of the first line connector, for example on a surface that is opposite the stop surface with the counter-stop of the second line connector.

The first line connector can advantageously comprise at least three, advantageously four, spacers which are designed to come into contact at their free end with the second line connector so as to define a radial distance of the second line connector relative to the first line connector. The spacers can for example be designed as simple pin-like projections which protrude radially outward from the first line connector. The spacers can be evenly distributed in a circumferential direction around the first line connector, in the example of three spacers, for example, at a distance of 120°. The spacers can in particular be of the same length or the extension of the spacers radially outward can be designed so that a distance from the centre axis of the first fluid passage of the first line connector to the free end of a respective spacer in the radial direction is substantially identical for each spacer. Thus, the second line connector or the portion of the second line connector defining the second fluid passage can be held in a coaxial manner with the first fluid passage. As a result, by providing the spacers, an annular second fluid passage can be formed which has a regular, in particular uniform, cross section.

Furthermore, the first line connector can comprise at least one guide rib which is designed to engage with a guide recess of the second line connector in order to secure the second line connector in a rotational manner with respect to the first line connector. It should be mentioned that a single projection on the first line connector can fulfil both the function of a spacer and the function of a guide group.

Of course, the spacers or the at least one guide rib between the two line connectors can also be interchanged in an analogous manner here.

In a further embodiment of the present invention, the second line connector can have a securing device which comprises at least one spring-mounted projection and which is designed to secure the second line connector on the superordinate assembly by the at least one projection of the securing device engaging with a corresponding recess the superordinate assembly. The securing device of the second line connector can form a snap connection with the superordinate assembly. The securing device can also cooperate with the superordinate assembly in such a way that the attachment device according to the invention is secured not only translationally but also rotationally relative to the superordinate assembly.

The securing device can comprise an oval ring, on the inside of which, in particular lying on a short axis of the oval ring, the at least one projection of the securing device is arranged, wherein the oval ring is elastic and is set up so that a shortening of a long axis of the oval ring, in particular due to a compression of the oval ring, causes an extension of the short axis of the oval ring so that the at least one projection of the securing device disengages from the corresponding recess on the superordinate assembly. As a result, the securing device can be designed to be detachable from the superordinate assembly. In particular on portions which are arranged on an outer circumferential surface of the oval ring and lying on the long axis of the oval ring, gripping surfaces can be arranged, which on the one hand can facilitate the compression of the oval ring and on the other hand can intuitively indicate to an operator at which place the oval ring is to be compressed in order to detach the attachment device from the superordinate assembly.

The terms "short axis" and "long axis" mentioned above relate to an unloaded state of the oval ring, that is to say a state of the oval ring in which no external force causes a deformation of the oval ring.

The oval ring and the at least one projection arranged on it can be made of an elastic material such as a plastic, in particular PA66 and PA6 with glass fibre reinforcement (GF30), or a metal, in particular the same material as a remaining part of the second line connector. The second line connector can be made in one piece from a single material.

The first line connector and the second line connector can advantageously be free from a sealing element in their assembled state, which sealing element is designed to interact both with the first line connector and the second line connector and/or be free of a receiving device which is designed to receive a sealing element which is designed to interact both with the first line connector and with the second line connector. This means that due to the inventive arrangement of the first line connector and the second line connector on one another, the first fluid passage and the second fluid passage are designed such that they can be guided into the superordinate assembly without necessitating a seal between the first line connector and the second line connector.

A sealing element which seals a space formed between the first line connector and the second line connector is to be understood as "interacting both with the first line connector and with the second line connector".

In an advantageous embodiment, the hose connection of the second line connector, in its assembled state on the first line connector, viewed along a longitudinal axis of the first fluid passage, can be arranged completely next to the hose connection of the first line connector. That is to say, viewed in a radial direction, there is no overlap between the hose connection of the first line connector and the hose connection of the second line connector. In other words, the end of the inner hose which is connected to the hose connection of the first line connector, viewed in a direction along the central axis of the first fluid passage, lies in front of the end of the second line connector, which is adjacent to the hose connection of the second line connector, in the assembled state of the attachment device.

Furthermore, the coupling connection of the second line connector, in its assembled state on the first line connector, viewed along an axis of the first fluid passage, can be arranged completely next to the coupling connection of the first line connector. Here too, viewed in a radial direction, there can be no overlap between the coupling connection of the first line connector and the coupling connection of the second line connector. For the definition of "side-by-side arrangement", reference is made to the corresponding description of the hose connections arranged side-by-side.

In a further aspect, the present invention relates to a line arrangement comprising a hose arrangement which comprises an outer hose and an inner hose which is arranged in the outer hose, and at least one attachment device which has at least one of the features mentioned above, wherein the inner hose is connected to the first line connector and the outer hose is connected to the second line connector. The line arrangement according to the invention can in particular be designed in such a way that a first fluid passage, which is defined in the interior of the inner hose and the first line connector, and a second fluid passage, which is defined by a space which lies between the inner and the outer hose or between the first and the second line connector extend substantially coaxially over the entire longitudinal extent of the line arrangement, viewed at radially overlapping portions.

An exemplary application of the line arrangement according to the invention is the conveyance of so-called blow-by gases in the inner hose and the application of a negative pressure to the fluid space of the outer hose, which is connected to a diagnostic device, in order, when blow-by gases are detected in the fluid space of the outer hose, to be able to determine a leakage of the inner hose.

In particular, the design of the line arrangement according to the invention can enable both the outer and the inner hose to be a flexible hose that is however substantially rigid in the longitudinal extension direction. This means that the present invention, in comparison to the prior art, in which such rigid hoses cannot be connected to attachment devices or can only be connected with great effort, also enables hoses arranged one inside the other to be connected to attachment devices which are not compressible and/or stretchable in their longitudinal extension direction.

With regard to further features of the line arrangement according to the invention, reference is made to the above description of the attachment device according to the invention, which is also used in relation to the line arrangement according to the invention.

In yet another aspect, the present invention relates to a method for connecting a hose arrangement, comprising at least one outer and one inner hose, to an attachment device, in particular an attachment device which has at least one of the features mentioned above, wherein the method comprises the steps of: providing the outer hose, providing the inner hose which is arranged in the outer hose, providing a first line connector which has a hose connection at one end thereof for connection to a hose and defines a first fluid passage in its interior, connecting the first line connector to the inner hose by pushing the hose connection of the first line connector into the inner hose, providing a second line connector which has a hose connection at one end thereof for connection to a hose and is set up for connection to the first line connector, wherein the second line connector, in its assembled state on the first line connector, surrounds the first line connector in such a way that a second fluid passage is created between the first line connector and the second line connector, which second fluid passage is fluidically separated from the first fluid passage, connecting the second line connector to the first line connector by pushing the second line connector onto the first line connector from the end thereof which is opposite the hose connection of the first line connector, connecting the second line connector to the outer hose by pushing the second line connector into the outer hose.

The method according to the invention thus makes it possible to first fully assemble the first line connector on the inner hose and only then to connect the second line connector to the outer hose. As a result, the assembly effort for connecting such a hose arrangement to an attachment device and thus also the risk of damage to the hose arrangement and/or the attachment device can be significantly reduced.

With regard to further conceivable features of the method according to the invention, reference is made to the above descriptions with reference to the attachment device according to the invention and/or to the line arrangement according to the invention, which are used in an analogous manner for the method according to the invention.

The method according to the invention can furthermore be designed in such a way that the step of connecting the second line connector to the first line connector can comprise at least one springy web of the second line connector engaging with a recess of the first line connector so as to prevent a displacement of the second line connector relative to the first line connector in a direction opposite to a push-on direction. According to this embodiment, the second line connector can be pushed onto the first line connector until the at least one springy web of the second line connector engages with the recess of the first line connector. This engagement is usually accompanied by acoustic feedback in the form of a "click" sound. After the at least one springy web engages with the corresponding recess, a displacement in a direction opposite to the push-on direction can be prevented by the interaction of the at least one springy web with an edge of the recess. The first line connector and the second line connector have thus reached their assembled state on one another.

Furthermore, the step of connecting the second line connector to the first line connector can comprise at least three, advantageously four, spacers coming into contact at their free end with the second line connector, so as to define a radial distance of the second line connector relative to the first line connector. By contacting the free ends of the spacers with an inner section of the second line connector, a radial alignment of the second line connector on the first line connector can be defined so that, for example, the second fluid passage can have a uniform cross section.

As already described above, the first line connector can be provided with guide ribs which engage with corresponding recesses, in particular grooves, of the second line connector in order to prevent rotation of the second line connector relative to the first line connector.

BRIEF DESCRIPTION OF THE DRAWINGS

Hereinafter, the present invention will be described in detail using an embodiment with reference to the accompanying drawings, in which.

Figure 1:
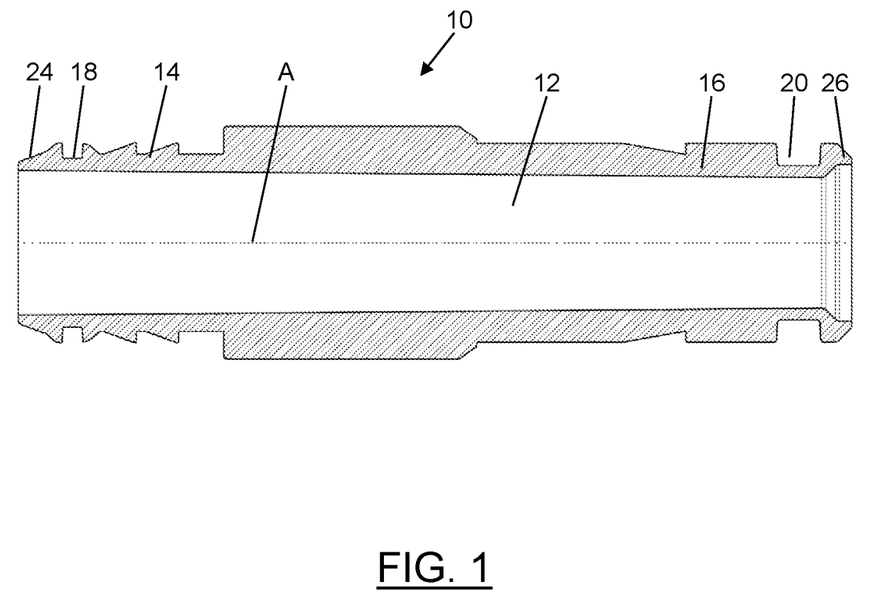
FIG. 1 is a side cross-sectional view of an exemplary first line connector.

In FIG. 1, a first line connector is generally designated by the reference number 10. The first line connector 10 has a first fluid passage 12 in its interior. The first fluid passage 12 is substantially cylindrical and has a central axis A.

At its end shown on the left in FIG. 1, the first line connector 10 has a hose connector 14 which is set up to be connected to a hose.

Figure 6:
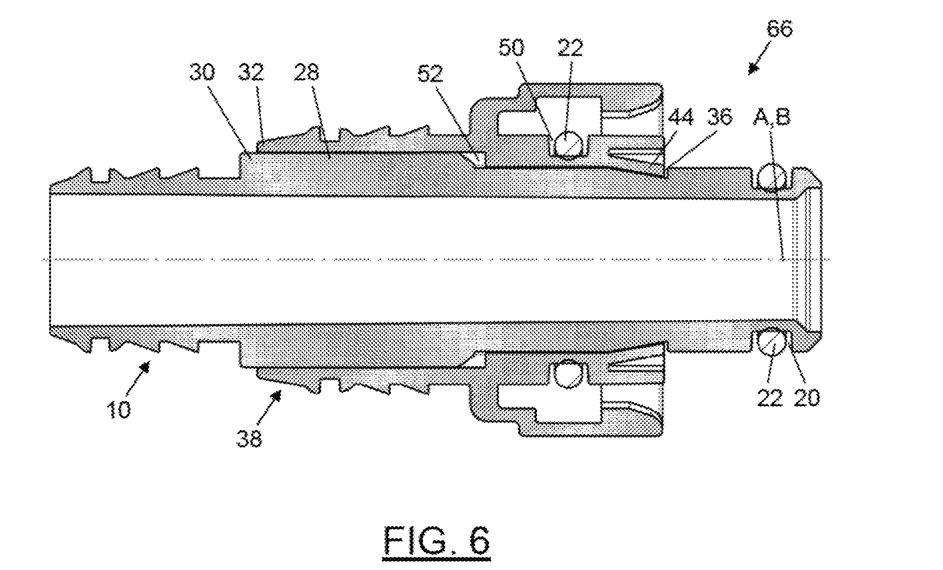
FIG. 6 is a side cross-sectional view of an embodiment of an attachment device according to the invention, comprising the first line connector from FIGS. 1 and 2 and the second line connector from FIGS. 3 to 5.

At its end shown on the right in FIG. 1, i.e. opposite the end of the hose connection 14 of the first line connector 10, the first line connector 10 has a coupling connection 16 which is designed to be connected to a superordinate assembly. At the hose connection 14 and at the coupling connection 16, the first line connector 10 has an annular groove 18 and 20, respectively, which surrounds an outer circumference of the first line connector 10 (see FIG. 2). The two grooves 18, 20 are each set up to receive an O-ring 22 (one of which is shown in FIG. 6), which is set up as a sealing element between the first line connector 10 and the hose connected to the hose connection 14 or to act between the first line connector 10 and the superordinate assembly.

Adjacent to the two longitudinal ends of the first line connector 10, the first line connector 10 has in each case an insertion bevel 24 and 26, which is suitable for making it easier to insert the first line connector 10 into a hose or into a connection of the superordinate assembly.

Figure 2:
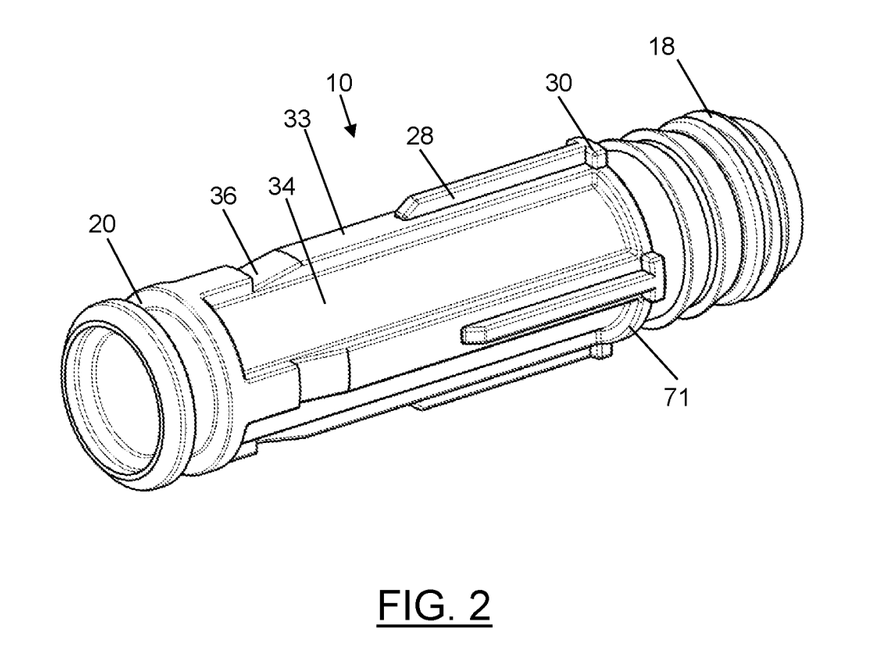
FIG. 2 is a perspective view of the first line connector of FIG. 1.

As can be seen in FIG. 2, the first line connector 10 has four guide ribs 28 on its outer circumference, which are evenly distributed over an outer circumference of the first line connector 10 in a circumferential direction. The guide ribs 28 extend in a direction parallel to the central axis A. At their end adjacent to the hose connection 14 of the first line connector 10, the guide ribs 28 each have a stop 30, which is designed to rest against a counter-stop 32 (see FIG. 4). In the embodiment shown, the guide ribs 28 are arranged at a respective free end of a spacer 33, that is to say in the direction of a radial extension of a respective spacer 33. The radially outer surfaces of the spacers 33, which here correspond to the surfaces on which the guide ribs 28 are arranged, are designed to come into contact with an inner wall of the second line connector 38 in order to determine a radial alignment of the second line connector 38 relative to the first line connector 10, especially in terms of centring, (see FIG. 6).

Elongated passages 34 are formed between each two spacers 33. The operation of the passages 34 will be described further below with reference to FIG. 7. However, it should already be mentioned at this point that the passages 34 to portions of the first line connector 10 adjacent to them can be deepened, but also planar or even raised, as long as a distance between the passages 33 and an adjacent section of the second line connector 38 in the radial direction is complied with. In the example shown, the passages 34 are designed to be deepened in order to be able to obtain a material reduction on the first line connector 10 in the area of the passages 33 in the form of a reduced wall thickness.

In FIG. 2, recesses 36 in a respective spacer 33 can also be seen on the outside of the first line connector 10. The recesses 36 are designed to act as depressions and undercuts of a snap connection (see below). In the example shown in FIG. 2, the recesses 36 are on a line with respectively assigned guide ribs 28, wherein this line is aligned parallel to the central axis A. Accordingly, the same number of recesses 36 and guide ribs 28 result.

Figure 3:
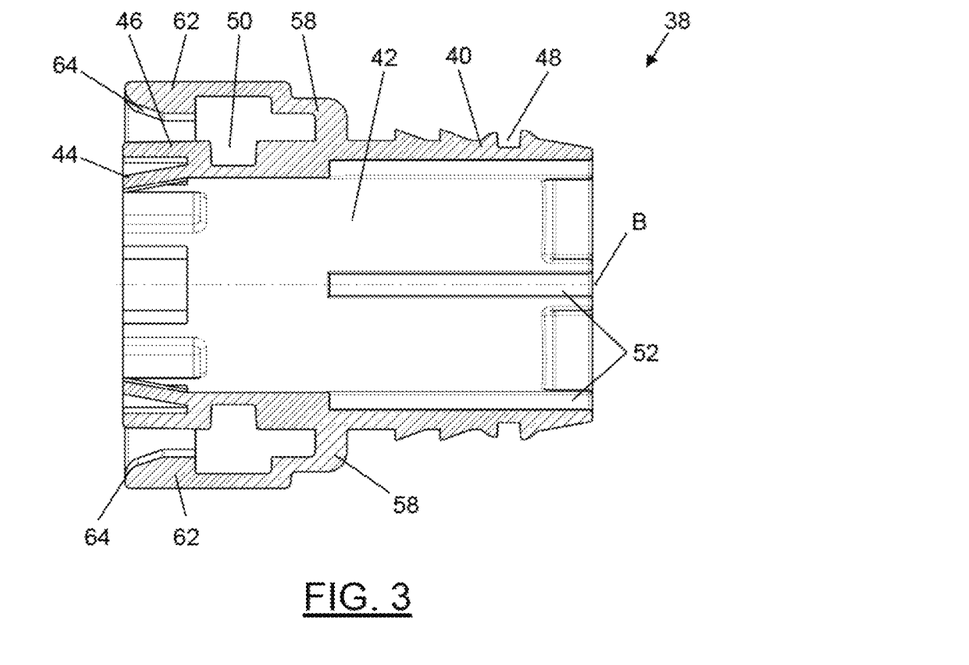
FIG. 3 is a side cross-sectional view of an exemplary second line connector.

Referring now to FIG. 3, a second line connector 38 is shown in a side cross-sectional view. The second line connector 38 has at one end a hose connection 40 which is set up to be connected to a hose. In its interior, the second line connector 38 has a substantially cylindrical passage 42. The passage 42 defines a central axis B which extends in the longitudinal direction through the passage 42.

At its end opposite the hose connection 40, the second line connector 38 has a plurality of springy webs 44 which are formed in one piece with the second line connector 38 and protrude radially inward, that is, into the passage 42. In the embodiment shown in FIG. 3, the second line connector 38 has four springy webs 44, which are arranged distributed uniformly in a circumferential direction on an inner surface of the second line connector 38.

Radially outwardly adjacent to the springy webs 44, the second line connector 38 has a coupling connection 46 which is set up to couple the second line connector 38 to a superordinate assembly. Analogous to the first line connector 10, the second line connector 38 has a respective groove 48 and 50 on its hose connection 40 and on its coupling connection 46, which groove is designed to receive an O-ring (see FIG. 5 or FIG. 6).

On the inner wall of the second line connector 38 defining the passage 42, said inner wall has four guide recesses 52, which are designed to engage with the guide ribs 28 of the first line connector 10. Correspondingly, the guide recesses 52 are also evenly distributed in the circumferential direction of the second line connector 38 or of the passage 42. The guide recesses 52 extend in a direction parallel to the central axis B at least over the same length as the guide ribs 28, advantageously over a greater length than the guide ribs 28. In the embodiment of the second line connector 38 shown in FIG. 3, the guide recesses 52 extend over more than half of the longitudinal extent of the second line connector 38 in the direction of the central axis B.

Figure 4:
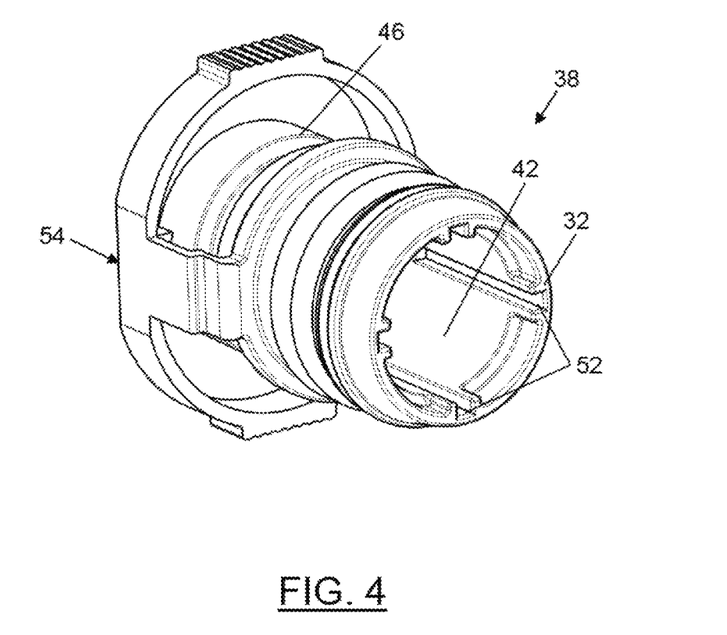
FIG. 4 is a perspective view of the second line connector of FIG. 3.

As can be seen in FIG. 4, the guide recesses 52 begin at a planar end face of the second line connector 38, which functions as the above-described counter-stop 32 of the second line connector 38. The guide recesses 52 extend from this flat surface on the wall of the passage 42 in a direction parallel to the central axis B of the passage 42.

Figure 5:
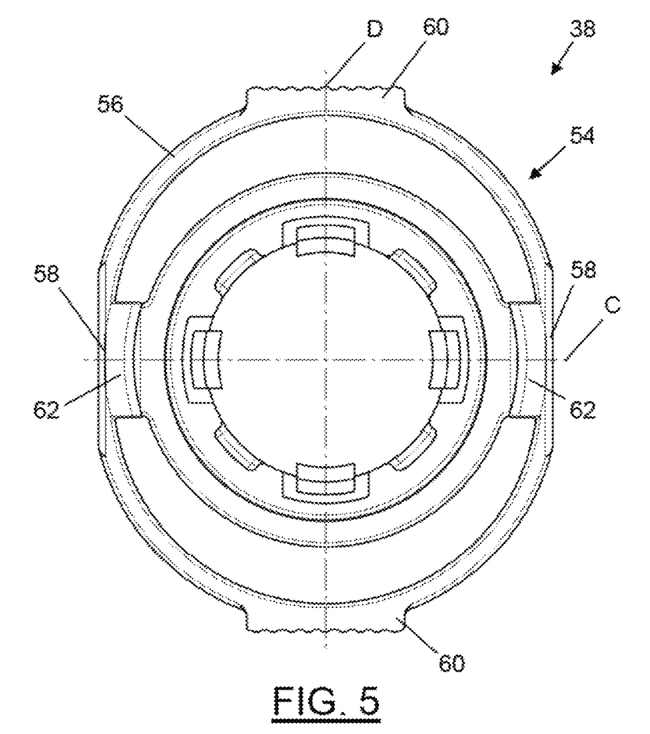
FIG. 5 is a plan view of the end of the second line connector shown on the left in FIG. 3.

As can also be seen in FIG. 4, the coupling connection 46 of the second line connector 38 is assigned a securing device 54, which will now be described in greater detail with reference to FIG. 5. The securing device 54 is set up to secure the second line connector 38 on the superordinate assembly. The securing device 54 has an oval ring 56 which is connected to the wall of the second line connector 38 at two portions 58 of the oval ring 56, which lie on a short axis C of the oval ring 56 (see also FIG. 3). The oval ring 56 has gripping surfaces 60 at two portions, which lie on a long axis D of the oval ring 56, which are suitable for being gripped by a user in order to compress the oval ring 56 along the long axis D. The type of connection 58 of the oval ring 56 with the rest of the second line connector 38 allows the long axis D to be shortened and the short axis C to be lengthened when the two gripping surfaces 60 are compressed, that is, the gripping surfaces 60 are moved towards one another. By lengthening the short axis C, the portions 58 of the oval ring 56 are moved away from one another along the axis C.

On an inside of the oval ring 56, projections 62 protruding radially inward are arranged on the portions 58 of the oval ring 56 (see also FIG. 3), which projections are set up to engage with corresponding recesses on the superordinate assembly in order to secure the second line connector 38 in the sense of a snap connection to the superordinate assembly. If the short axis C of the oval ring 56 is now lengthened by compressing the gripping surfaces 60, the projections 62 of the securing device 54 disengage from the corresponding recesses on the superordinate assembly, so that the second line connector 38 can be released from the superordinate assembly. If the gripping surfaces 60 are no longer compressed, the securing device 54 or the oval ring 56 deforms back into the unloaded state shown in FIG. 5. For easier coupling of the second line connector 38 to the superordinate assembly, the projections 62 of the securing device 54 have insertion bevels 64 (see FIG. 3).

In FIG. 6, the assembled state of the first line connector 10 and the second line connector 38 on each other is shown. In this assembled state, the first line connector 10 and the second line connector 38 form an attachment device 66 according to the invention. As can be seen in FIG. 6, the second line connector 38 is pushed completely onto the first line connector 10 from its end, which has the coupling connection 16. In this assembled state, the springy webs 44 of the second line connector 38 are in engagement with the recesses 36 of the first line connector 10. Furthermore, the stops 30 of the first line connector rest against the counter-stops 32, which have a common flat surface of the second line connector 38. The guide ribs 28 of the first line connector 10 engage with the corresponding guide recesses 52 of the second line connector 38. It can be clearly seen in FIG. 6 that the guide recesses 52 of the second line connector 38 are longer than the length of the guide ribs 28 of the first line connector 10 up to which the second line connector 38 can be pushed onto them. In addition, it can be seen in FIG. 6 that in a direction perpendicular to the central axes A and B, the free end of a respective spacer 33 is in contact with an inner wall of the second line connector 38, so that the orientation of the second line connector 38 relative to the first line connector 10 is fixed in a direction perpendicular to the central axis A or the central axis B by the spacers 33.

In the groove 20 of the first line connector 10 and in the groove 50 of the second line connector 38 an O-ring 22 is arranged in each case, which acts as a sealing element between the first line connector 10 and the superordinate assembly or the second line connector 38 and the superordinate assembly. The central axes A and B coincide in the embodiment shown in FIG. 6.

Figure 7:
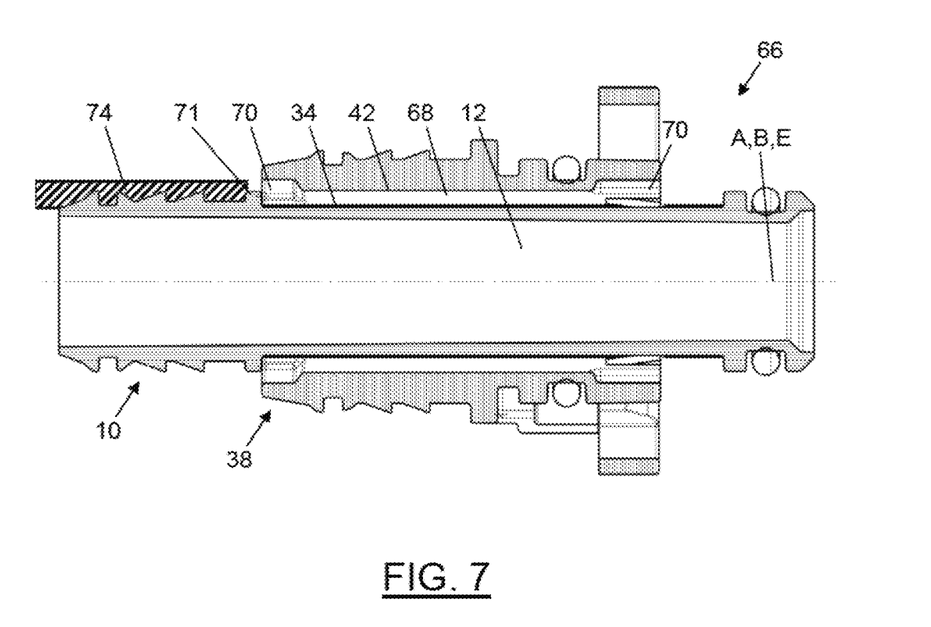
FIG. 7 is a further side cross-sectional view of the attachment device from FIG. 6.

In FIG. 7, the attachment device 66 is shown along a sectional plane rotated by 45° about the central axis A in relation to the sectional plane of FIG. 6. It can be seen in FIG. 7 that the passages 34 of the first line connector 10 arranged in the circumferential direction between the spacers 33 of the first line connector 10 define a second fluid passage 68 with the inner wall of the second line connector 38 defining the passage 42. According to the above-described configurations of the first line connector 10, the passages 34, the second line connector 38 and the passage 42, the second fluid passage 68 runs concentrically to the first fluid passage 12, so that the second fluid passage 68 has a central axis E coinciding with the central axes A and B. The second fluid passage 68 has a substantially annular cross section over its entire length through the second line connector 38, which, however, is pierced by the spacers 33 of the first line connector 10. At its two ends, the second fluid passage 68 has widenings 70 of the second fluid passage 68, which are arranged in the second line connector 38 and which can improve the flow properties of a fluid flowing through the second fluid passage 68, since a projection 71 can be flowed around through the widenings 70 against which projection a hose to be pushed onto the first line connector 10 can rest, which is shown in FIG. 7 on the upper half of the hose connection 14 of the first line connector 10 as a hatched cuboid 74.

Figure 8:
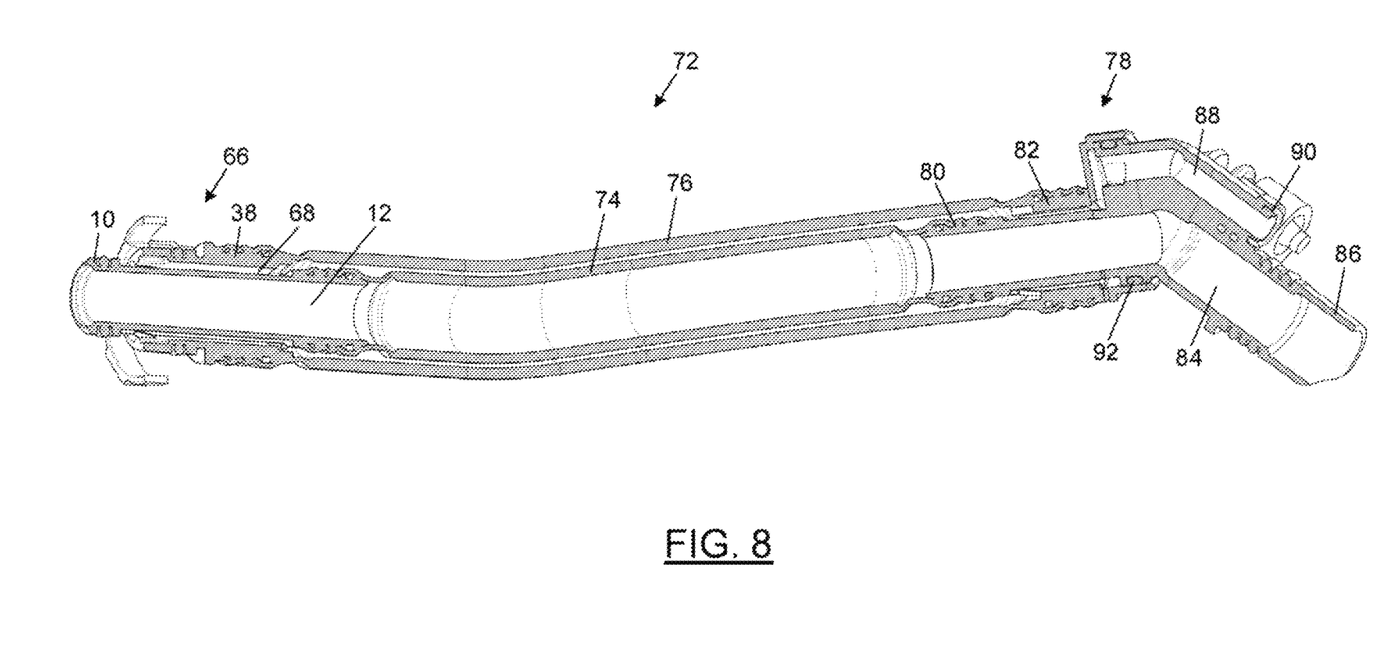
FIG. 8 represents an embodiment of a line arrangement according to the invention, comprising the attachment device from FIGS. 5 and 6.

FIG. 8 shows a line arrangement 72 according to the invention, which comprises an inner hose 74 which is arranged in an outer hose 76. At the end shown on the left in FIG. 8, the inner hose 74 and the outer hose 76 are connected to an attachment device 66 according to the invention, as has been described in detail above. It can be clearly seen in FIG. 8 that the first fluid passage 12 extends from the interior of the inner hose 74 through the first line connector 10 to a superordinate assembly (not shown). The second fluid passage 68 extends from a space which is formed between the inner hose 74 and the outer hose 76 and thus surrounds the inner hose 74 in an annular manner, through the space formed between the first line connector 10 and the second line connector 38 into the superordinate assembly. The first fluid passage 12 and the second fluid passage 68 therefore extend both in the hose arrangement, which is formed from the hoses 74 and 76, and in the attachment device 66 according to the invention, coaxially into the superordinate assembly.

At the end of the inner hose 74 and the outer hose 76 shown on the right in FIG. 8, a further attachment device 78 is shown, which will be briefly described below.

The further attachment device 78 has a first hose connection 80, which is connected to the inner hose 74, and a second hose connection 82, which is connected to the outer hose 76. A fluid passage 84 of the further attachment device 78, which is connected to the first fluid passage 12, leads from the first hose connection 80 of the further attachment device 78 through the further attachment device 78 to a first coupling connection 86 of the further attachment device 78, which is set up to be connected to a connection of a further superordinate assembly (not shown). A further fluid passage 88 connected to the second fluid passage 68 branches off radially outward from an annular widening of the second fluid passage 68 between the outer hose 76 and the first hose connection 80 of the further attachment device 78 and then runs parallel to the one fluid passage 84 of the further attachment device 78 up to a further coupling end 90 of the further attachment device 78, which is set up to be connected to a further connection of the further superordinate assembly, which is arranged on the further superordinate assembly separately from the one connection. A sealing element 92 is arranged on the further attachment device 78, which acts between two parts of the further attachment device in the sense of a first line connector and a second line connector in order to seal a space formed therebetween from the outside.

The invention claimed is:

1. An attachment device for a hose arrangement having a plurality of chambers, comprising:
 a first line connector comprising a hose connection at a first end of the first line connector for connection to a first chamber of the hose arrangement, and
 a second line connector comprising a hose connection at an end of the second line connector for connection to a second chamber of the hose arrangement,
 wherein the first line connector defines a first fluid passage in an interior of the first line connector and the first line connector comprises at least three spacers, each of the at least three spacers designed to contact at a free end of the respective spacer with the second line connector, to define a radial distance of the second line connector relative to the first line connector;
 wherein the second line connector and the first line connector are operationally fixedly connected in an assembled state, wherein the second line connector surrounds the first line connector in the assembled state so that a second fluid passage is produced between the first line connector and the second line connector, wherein the second fluid passage is fluidically separated from the first fluid passage;
 wherein the hose connection of the first line connector and the hose connection of the second line connector are arranged on a same side of the attachment device in the assembled state, and
 wherein the second line connector can be pushed onto the first line connector from a second end of the first line connector opposite to the hose connection of the first line connector from a completely separated state into the assembled state.

2. The attachment device of claim 1, wherein the first fluid passage runs coaxially with the second fluid passage.

3. The attachment device of claim 1, wherein the first line connector further comprises, at the second end, a first coupling connection;
 wherein the second line connector further comprises, at the end of the second line connector opposite the hose connection of the second line connector, a further coupling connection; and
 wherein the first coupling connection of the first line connector runs coaxially with the further coupling connection of the second line connector.

4. The attachment device of claim 3, wherein the second line connector comprises a securing device that includes at least one spring-mounted projection.

5. The attachment device of claim 4, wherein the securing device comprises an oval ring, wherein the at least one spring-mounted projection of the securing device is arranged on an inside area of the oval ring; and
 wherein the oval ring is elastic and is configured so that a shortening of a long axis of the oval ring due to a compression of the oval ring causes an extension of A short axis of the oval ring.

6. The attachment device of claim 5, wherein the at least one spring-mounted projection of the securing device is arranged on the inside area of the oval ring and lying on the short axis of the oval ring.

7. The attachment device of claim 1, wherein the second line connector further comprises at least one web, wherein the web is designed, in the assembled state, to engage with at least one recess of the first line connector to prevent a displacement of the second line connector relative to the first line connector in a direction opposite to a push-on direction.

8. The attachment device of claim 1, wherein the first line connector comprises at least one stop designed to rest against at least one counter-stop of the second line connector to prevent displacement of the first line connector relative to the second line connector in a push-on direction.

9. The attachment device of claim 1, wherein the first line connector and the second line connector are free from a sealing element between the first line connector and the second line connector in the assembled state.

10. The attachment device of claim 1, wherein the hose connection of the second line connector, in the assembled state and viewed along a longitudinal axis of the first fluid passage, is positioned adjacent to the hose connection of the first line connector.

11. The attachment device of claim 1, further comprising a sealing element, wherein the sealing element is designed to interact both with the first line connector and with the second line connector.

12. The attachment device of claim 1, wherein the at least three spacers comprise four spacers.

\* \* \* \* \*